Oct. 1, 1963     E. SÖDERMAN     3,105,267
METHOD OF COLLECTING ENDS OF INTESTINES
Filed Sept. 21, 1960
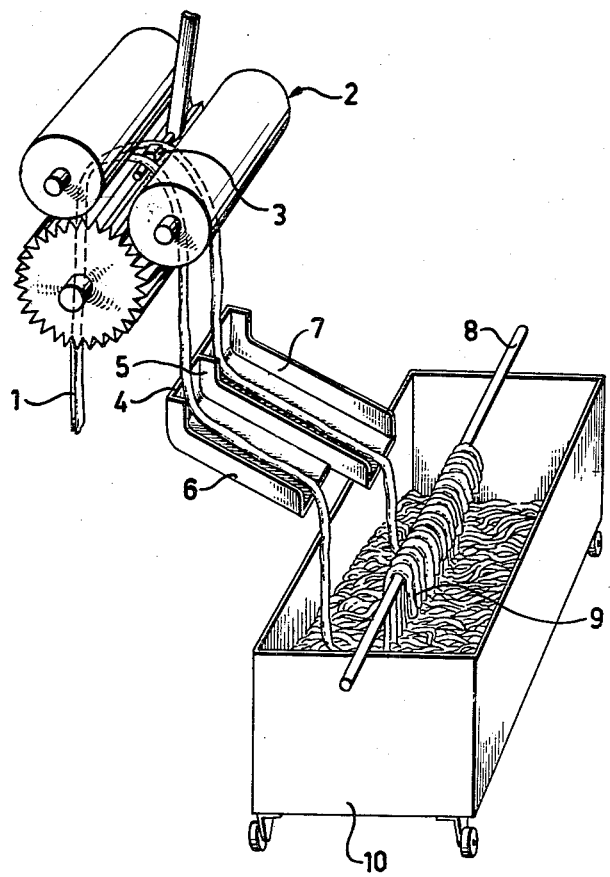
EINAR SÖDERMAN
INVENTOR.
BY
ATTORNEY.

United States Patent Office 3,105,267
Patented Oct. 1, 1963

---

3,105,267
METHOD OF COLLECTING ENDS OF INTESTINES
Einar Söderman, Sundsvall, Sweden, assignor to Kontrollhudar, Andelsslakteriernas Forening UPA, Malmo, Sweden, a corporation of Sweden
Filed Sept. 21, 1960, Ser. No. 57,546
Claims priority, application Sweden Nov. 9, 1959
3 Claims. (Cl. 17—45)

The present invention relates to a method and a device for collecting the ends of intestines at the discharge end of a stripping machine.

In mechanical cleaning of intestines for sausage casings a great number of cleaned intestines are collected in a collecting container before they are conveyed to sausage filling machines or other machines. On account of the considerable length of the intestines it is difficult and time-consuming to get hold of the ends of the intestines in these collecting containers which, however, is necessary in connection with the sausage filling operation.

This inconvenience is avoided according to the present invention by the ends of the intestines being intercepted by a special suspension device at the discharge end of the stripping machine. The principle of the method according to the invention is based on the throwing motion performed by the intestine end when it rapidly slides off from the edge of a sloping feeding out or delivery table. In this throwing motion the end is thrown along a curved path away from the edge of the delivery table and is intercepted by the suspension device so that the free end of the intestine will be suspended on this device and thus be readily accessible as will be fully understood from the following description.

The invention will be described in greater detail in the following with reference to the annexed drawing which shows in perspective an embodiment of the device according to the invention.

The intestine 1 is introduced between the rollers of a cleaning machine 2 and is fed out onto a table 4 having one or more longitudinal partition walls 5 and end walls 6, 7. From the table the intestines are preferably conveyed to a collecting container 10 below the delivery table. When the ends 9 of the intestines slide over the edge of the delivery table, they are thrown in a curve away from the edge and intercepted by at least one suspension device 8, e.g. in the form of a bar or strip disposed below and somewhat ahead of the edge of the table.

The travelling speed of the end or ends of the intestines sliding downwards over the table 4 is controlled in relation to the distance between the lower edge of the table 4 and the bar 8 in such a manner that said end or ends will be thrown over the bar 8 and retained thereon by friction while the remaining parts of the intestines are collected in the container 10.

For cleaning and for assisting the throwing motion from the table, water may be sprayed on the same. When a sufficient number of intestines have been cleaned and the ends 9 have been collected on the device 8 they may be transferred to a collecting device where the ends are tied up and the intestines transferred to a transport container.

According to one embodiment of the invention the intestine is introduced into the cleaning machine doublefolded with the folded end first, whereupon the two parts of the intestine are kept separated by means of a separating member 3 during the passage through the machine and are delivered on either side of the partition wall 5. The table 4 is longer on one side of the partition wall 5 than on the other, whereby only that end 9 of the intestine which slides along the longer table side is intercepted by the device 8. By the doublefolding it is achieved that the end of the intestine will be intercepted on the holding device 8, and it is also gained that the actual length of intestine to be handled only becomes half as long.

A table 4 having different lengths on either side of a partition wall may also be used for collecting separately the ends of a plurality of various intestines which are fed simultaneously through the machine, in which case further suspension devices are disposed below the table for these intestine ends. After the desired number of ends have been collected on the suspension device or on a subsequent collecting device, the intestines are clustered by the ends suspended next to each other being tied up.

As apparent from the above several modifications may be made within the scope of the invention without departing from its principle.

What I claim is:

1. A method for separately collecting the trailing ends of intestines on the outcoming side of an intestine cleaning machine which comprises, causing said intestines to glide along a downwardly sloping delivery surface, throwing said ends of said intestines in the form of an arc away from the end edge of said surface, intercepting at least one of said ends and holding it in frictional suspension at a position below and spaced from said end edge and collecting the unsupported portion of said intestines at a position below said suspension.

2. The method as in claim 1 and including, feeding both ends of said intestine down said delivery surface and separating the ends of said intestines from each other in the course of causing the same to slide down said delivery surface.

3. The method as in claim 2 and including, controlling the gliding speed of one of said ends with respect to the other over said surface.

References Cited in the file of this patent
UNITED STATES PATENTS

| | | |
|---|---|---|
| 1,334,694 | Dufresne | Mar. 23, 1920 |
| 2,104,450 | Campbell | Jan. 4, 1938 |
| 2,125,950 | Pardekooper | Aug. 9, 1938 |